(12) United States Patent
Lin (10) Patent No.: US 10,602,471 B2
(45) Date of Patent: Mar. 24, 2020

(54) COMMUNICATION SYSTEM AND SYNCHRONIZATION METHOD

(71) Applicant: HTC Corporation, Taoyuan (TW)

(72) Inventor: Cheng-Kang Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 45 days.

(21) Appl. No.: 15/889,170

(22) Filed: Feb. 5, 2018

(65) Prior Publication Data

US 2018/0227869 A1    Aug. 9, 2018

Related U.S. Application Data

(60) Provisional application No. 62/456,130, filed on Feb. 8, 2017, provisional application No. 62/456,133, filed on Feb. 8, 2017.

(51) Int. Cl.
*G06F 1/12* (2006.01)
*H04J 3/06* (2006.01)
*H04W 56/00* (2009.01)
*G01S 7/52* (2006.01)
*H04L 5/00* (2006.01)

(52) U.S. Cl.
CPC ..... *H04W 56/0065* (2013.01); *G01S 7/52087* (2013.01); *H04L 5/0055* (2013.01)

(58) Field of Classification Search
CPC .......... H04W 56/0015; H04W 56/005; H04W 84/20; H04J 3/0664; H04J 3/0697; H04J 3/0667; H04L 7/0033; H04L 43/0852; G06F 1/10; G06F 1/12
USPC ...................................................... 370/503
See application file for complete search history.

(56) References Cited

U.S. PATENT DOCUMENTS

| | | | | |
|---|---|---|---|---|
| 9,408,251 | B2* | 8/2016 | Grady | H04W 84/18 |
| 9,471,090 | B2* | 10/2016 | Kindred | G06F 1/12 |
| 9,940,827 | B2* | 4/2018 | Suomela | H04R 1/1041 |
| 2009/0088821 | A1* | 4/2009 | Abrahamson | A61N 1/37252 |
| | | | | 607/60 |

(Continued)

FOREIGN PATENT DOCUMENTS

| | | |
|---|---|---|
| CN | 1812350 A | 8/2006 |
| CN | 102104565 A | 6/2011 |

(Continued)

OTHER PUBLICATIONS

Corresponding Taiwan office action dated Sep. 7, 2018.
Corresponding Chinese office action dated Mar. 27, 2019.

*Primary Examiner* — Edan Orgad
*Assistant Examiner* — Vanneilian Lalchinthang
(74) *Attorney, Agent, or Firm* — CKC & Partners Co., LLC (57) ABSTRACT

A synchronization method is suitable between a first electronic apparatus and a second electronic apparatus. The synchronization method include following steps. A first interrupt signal is generated to trigger a first timer on the first electronic apparatus. A radio frequency packet is transmitted from the first electronic apparatus to the second electronic apparatus. In response to that the radio frequency packet is received by the second electronic apparatus, a second interrupt signal is generated to trigger a second timer on the second electronic apparatus. The second timer is synchronized with the first timer or a timestamp of the first timer is estimated according to the second interrupt signal and the radio frequency packet.

15 Claims, 8 Drawing Sheets

(56) References Cited

U.S. PATENT DOCUMENTS

| | | | | |
|---|---|---|---|---|
| 2010/0158181 | A1* | 6/2010 | Hadzic | H03L 7/085 375/371 |
| 2011/0110358 | A1* | 5/2011 | Haartsen | H04J 3/0632 370/350 |
| 2011/0276648 | A1* | 11/2011 | Soldan | G06F 1/12 709/208 |
| 2013/0080817 | A1* | 3/2013 | Mihelic | G06F 1/12 713/401 |
| 2013/0129347 | A1 | 5/2013 | Shin et al. | |
| 2014/0081593 | A1* | 3/2014 | Hess | G01M 13/045 702/145 |
| 2016/0235323 | A1* | 8/2016 | Tadi | A61B 5/7285 |

FOREIGN PATENT DOCUMENTS

| | | |
|---|---|---|
| CN | 102139160 A | 8/2011 |
| CN | 102355319 A | 2/2012 |

* cited by examiner

COMMUNICATION SYSTEM AND SYNCHRONIZATION METHOD

CROSS-REFERENCE TO RELATED APPLICATION

This application claims priority to U.S. Provisional Application Ser. No. 62/456,130, filed on Feb. 8, 2017, which is herein incorporated by reference. This application further claims priority to U.S. Provisional Application Ser. No. 62/456,133, filed on Feb. 8, 2017, which is herein incorporated by reference.

BACKGROUND

Field of Invention

The present application relates to a communication system. More particularly, the present application relates to a synchronization method between different devices in the communication system.

Description of Related Art

When two devices are communicating with each other, these two devices need a common time reference, such that a transmitter of these two devices can transmit data at correct timing and a receiver of these two devices can sample or receive data also at correct timing. If these two devices are not synchronized with each other, some errors may occur to the data transmitted between these two devices. For example, the data may contain severe jitters or noises.

SUMMARY

An aspect of the disclosure is to provide a communication system, which includes a first electronic apparatus and a second electronic apparatus. The first electronic apparatus includes a first control circuit and a first radio frequency transceiver. The first radio frequency transceiver is coupled with the first control circuit. The first radio frequency transceiver is configured to generate a first interrupt signal to the first control circuit and transmit a radio frequency packet. The second electronic apparatus includes a second control circuit and a second radio frequency transceiver. The second radio frequency transceiver is coupled with the second control circuit. The second radio frequency transceiver is configured to receive the radio frequency packet and generate a second interrupt signal to the second control circuit in response to that the radio frequency packet is received. The first interrupt signal is configured to trigger a first timer of the first control circuit. The second interrupt signal is configured to trigger a second timer of the second control circuit. The second timer is synchronized with the first timer or a timestamp of the first timer is estimated according to the second interrupt signal and the radio frequency packet.

Another aspect of the disclosure is to provide a synchronization method, which is suitable between a first electronic apparatus and a second electronic apparatus. The synchronization method include following steps. A first interrupt signal is generated to trigger a first timer on the first electronic apparatus. A radio frequency packet is transmitted from the first electronic apparatus to the second electronic apparatus. In response to that the radio frequency packet is received by the second electronic apparatus, a second interrupt signal is generated to trigger a second timer on the second electronic apparatus. The second timer is synchronized with the first timer or a timestamp of the first timer is estimated according to the second interrupt signal and the radio frequency packet.

Based on aforesaid embodiments, the second timer on the second electronic apparatus is synchronized with the first timer on the first electronic apparatus. Therefore, the data transmission between the first electronic apparatus and the second electronic apparatus can refer to synchronized clock signals on the first timer and the second timer respectively. In an embodiment, an ultrasound packet is transmitted between the first electronic apparatus and the second electronic apparatus, such that ultrasound transmission between the first electronic apparatus and the second electronic apparatus can refer to the synchronized clock signals.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
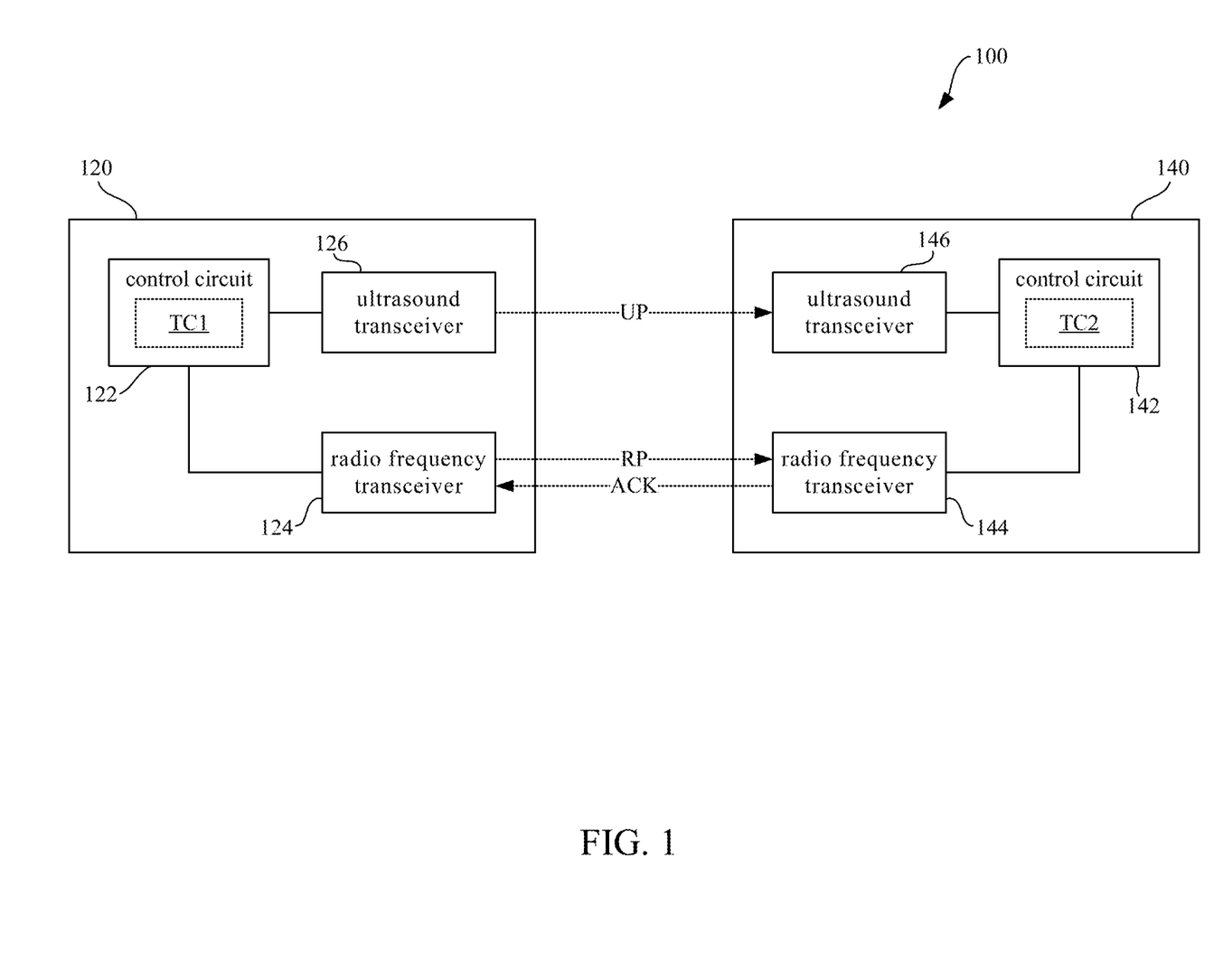
FIG. 1 is a functional block diagram illustrating a communication system according to an embodiment of the disclosure.

Reference is made to FIG. 1, which is a functional block diagram illustrating a communication system 100 according to an embodiment of the disclosure. The communication system 100 includes at least two electronic apparatuses. In the embodiment shown in FIG. 1, the communication system 100 includes a first electronic apparatus 120 and a second electronic apparatus 140.

The first electronic apparatus 120 and the second electronic apparatus 140 are able to communicate with each other. For example, data, commands, and/or control signals can be transmitted from the first electronic apparatus 120 to the second electronic apparatus 140 or from the second electronic apparatus 140 to the first electronic apparatus 120.

As shown in FIG. 1, the first electronic apparatus 120 includes a control circuit 122, a radio frequency transceiver 124 and an ultrasound transceiver 126. The control circuit 122 is coupled to the radio frequency transceiver 124 and the ultrasound transceiver 126. In an embodiment, the control circuit 122 can be implemented by a micro-controller unit (MCU), a processor, a central processing unit (CPU), an application-specific integrated circuit (ASIC) or any equivalent controlling circuit. In an embodiment, the radio frequency transceiver 124 can be a wireless communication transceiver (e.g., a RFID transceiver, a WiFi transceiver, a Bluetooth transceiver or a BLE transceiver) which transmits over electromagnetic waves. In another embodiment, the control circuit 122 and the radio frequency transceiver 124 can be implemented by one integrated circuit unit, such as a radio frequency transceiver with a control logic component. The radio frequency transceiver 124 is able to transmit a radio frequency packet RP to one target device (i.e., the second electronic apparatus 140 in the embodiment). The ultrasound transceiver 126 can also be a wireless communication transceiver which transmits over ultrasound waves. The ultrasound transceiver 126 is able to transmit an ultrasound packet UP to the target device.

As shown in FIG. 1, the second electronic apparatus 140 includes a control circuit 142, a radio frequency transceiver 144 and an ultrasound transceiver 146. The control circuit 142 is coupled to the radio frequency transceiver 144 and the ultrasound transceiver 146. In an embodiment, the control circuit 142 can be implemented by a micro-controller unit (MCU), a processor, a central processing unit (CPU), an application-specific integrated circuit (ASIC) or any equivalent controlling circuit. In an embodiment, the radio frequency transceiver 144 can be a wireless communication transceiver (e.g., a RFID transceiver, a WiFi transceiver, a Bluetooth transceiver or a BLE transceiver) which transmits over electromagnetic waves. In another embodiment, the control circuit 142 and the radio frequency transceiver 144 can be implemented by one integrated circuit unit, such as a radio frequency transceiver with a control logic component. The radio frequency transceiver 144 is able to receive the radio frequency packet RP from the radio frequency transceiver 124. The ultrasound transceiver 146 can also be a wireless communication transceiver which transmits over ultrasound waves. The ultrasound transceiver 146 is able to receive the ultrasound packet UP from the ultrasound transceiver 126.

Figure 2A:
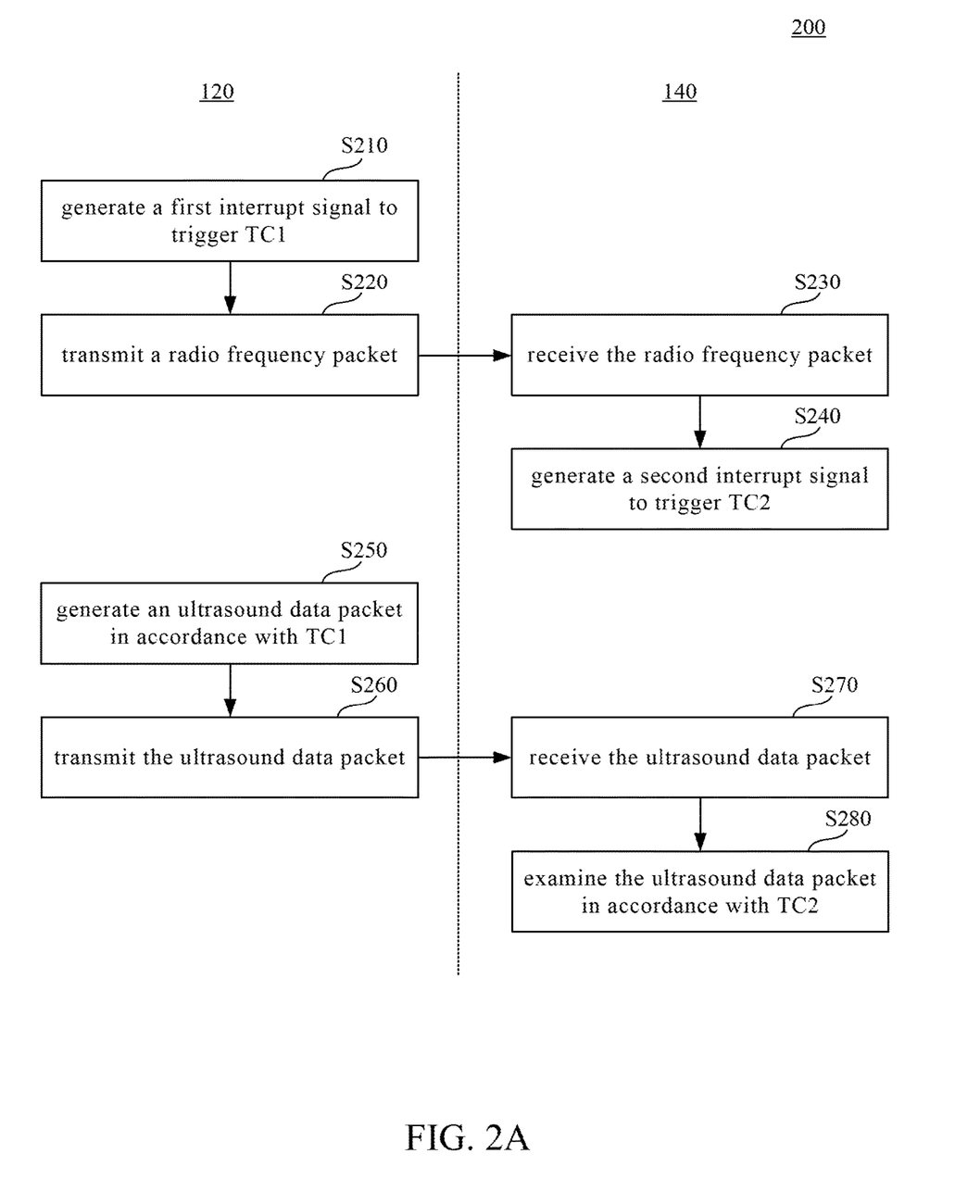
FIG. 2A is a flow chart illustrating a synchronization method according to an embodiment of the disclosure.

In order to make sure the communication between two apparatus is performed correctly, the first electronic apparatus 120 and the second electronic apparatus 140 require a common time reference or synchronized clock signals. Details about how to do time synchronization on the first electronic apparatus 120 and the second electronic apparatus 140 are explained in the following paragraphs. Reference is further made to FIG. 2A, which is a flow chart illustrating a synchronization method 200 according to an embodiment of the disclosure. The synchronization method 200 can be utilized on the communication system 100 shown in FIG. 1.

As shown in FIG. 1 and FIG. 2A, in step S210 of the synchronization method 200, the radio frequency transceiver 124 is configured to generate a first interrupt signal to the control circuit 122. In step S220, the radio frequency transceiver 124 is configured to transmit the radio frequency packet RP to the second electronic apparatus 140. In step S230, the radio frequency transceiver 144 is configured to receive the radio frequency packet RP from the first electronic apparatus 120. In step S240, the radio frequency transceiver 144 is configured to generate a second interrupt signal to the control circuit 142 in response to that the radio frequency packet RP is received.

Figure 3A:
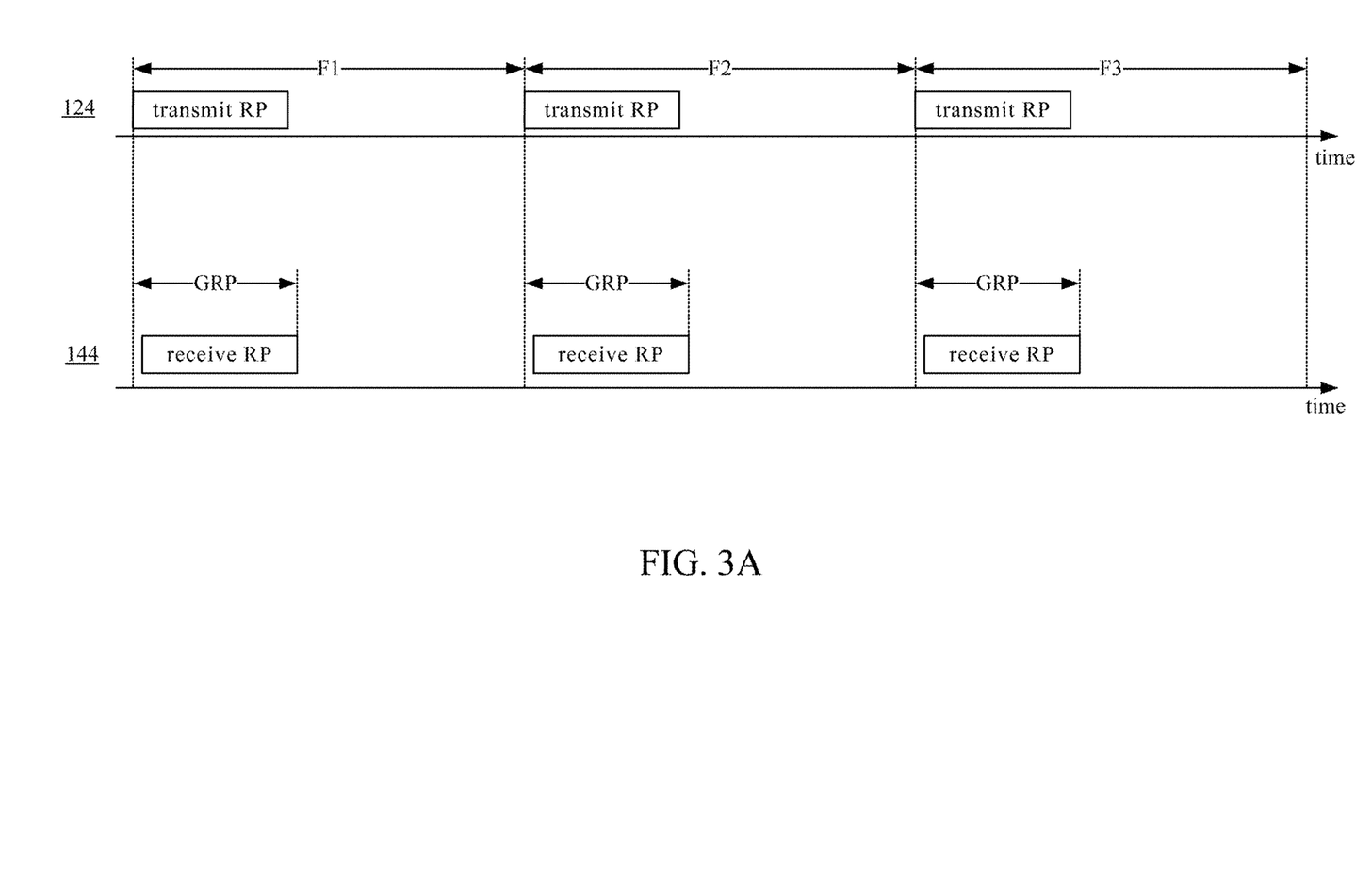
FIG. 3A is a time diagram illustrating a radio frequency packet transmitted between the radio frequency transceivers according to an embodiment.

Reference is further made to FIG. 3A. FIG. 3A is a time diagram illustrating the radio frequency packet RP transmitted between the radio frequency transceiver 124 and the radio frequency transceiver 144 according to an embodiment. As shown in FIG. 3A, the radio frequency transceiver 124 are configured to transmit the radio frequency packet RP periodically. In the embodiment shown in FIG. 3A, there are three consequent frames F1, F2 and F3. In an embodiment, each of the frames F1, F2 and F3 has an equal duration length. For example, the durations of the frames F1, F2 and F3 are all equal to a fixed radio frequency transmission interval (e.g., 5 milliseconds or 10 milliseconds). In this case, the radio frequency transceiver 144 will receive one radio frequency packet RP from the radio frequency transceiver 124 in every one radio frequency transmission interval.

Figure 3B:
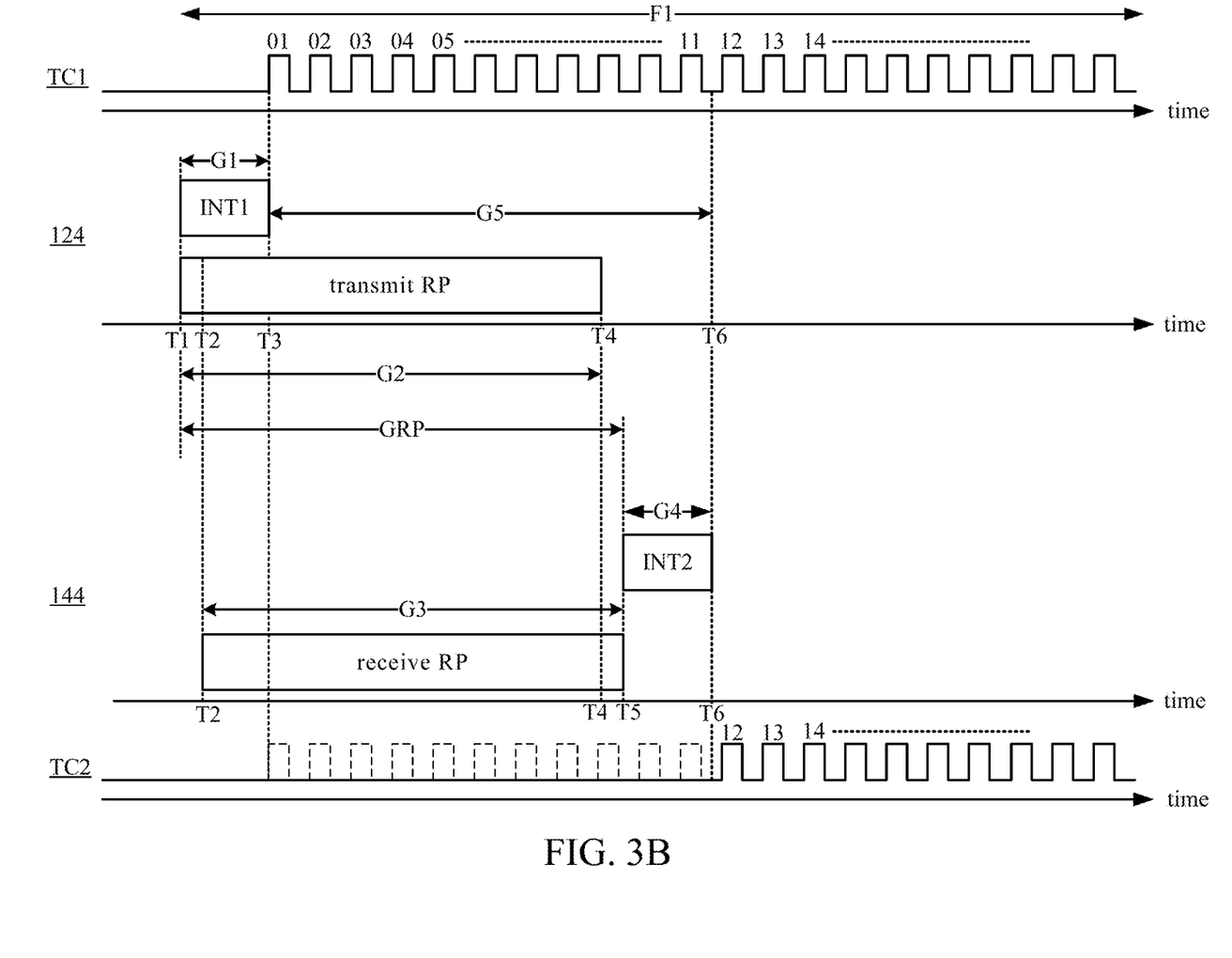
FIG. 3B is a time diagram illustrating more details about a first interrupt signal, the radio frequency packet, a second interrupt signal during one frame shown in FIG. 3A according to an embodiment.

Reference is further made to FIG. 3B. FIG. 3B is a time diagram illustrating more details about the first interrupt signal INT1, the radio frequency packet RP, the second interrupt signal INT2 during the frame F1 shown in FIG. 3A according to an embodiment.

As the embodiment shown in FIG. 3B, the radio frequency transceiver 124 generates the first interrupt signal INT1 to the control circuit 122 (i.e., the step S210) and starts to transmit the radio frequency packet RP (i.e., the step S220) simultaneously at a time point T1.

In step S210, the first interrupt signal INT1 is configured to trigger a first timer TC1 of the control circuit 122. In an embodiment, the first timer TC1 can be a time counter or a clock signal generator implemented by software/firmware programs run on the control circuit 122. In another embodiment, the first timer TC1 can be a frequency controlled oscillator or a clock generating circuit implemented by hardware circuits in the control circuit 122. The first interrupt signal INT1 is utilized to set a start point of the first timer TC1. As shown in FIG. 3B, the first interrupt signal INT1 arrive the control circuit 122 at a time point T3 later than the time point T1. The first timer TC1 starts to accumulate a time count (01, 02, 03, 04, 05 . . . ) periodically from the time point T3. In another embodiment, the first timer TC1 is implemented as a time stamp recorded at the time point T3. For example, the time stamp can be "2018-01-26-1136-36443" decided by a system clock. However, the time stamp is not limited to aforesaid format. In another embodiment, the time stamp can include more or fewer digits according to practical purposes.

There is a time gap G1 between the time points T1 and T3. The time gap G1 is induced by a circuitry path between the radio frequency transceiver 124 and the control circuit 122. In practices, the circuitry path is usually short because the radio frequency transceiver 124 and the control circuit 122 are both implemented in the first electronic apparatus 120. Therefore, the time gap G1 is usually shorter than 1 microsecond. The first timer TC1 activates to generate a clock signal started from the time point T3 in response to the first interrupt signal INT1.

In step S220, as shown in FIG. 3B, the radio frequency transceiver 124 starts to transmit the radio frequency packet RP at the time point T1. In an embodiment, the radio frequency transceiver 124 needs a little time to launch and prepare the radio frequency packet RP to be transmitted. As shown in FIG. 3B, the radio frequency transceiver 124 launches and prepares the radio frequency packet RP from the time point T1 to another time point T2. The radio frequency packet RP is sent by the radio frequency transceiver 124 from the time point T2 to another time point T4. A time gap G2 between the time points T1 and T4 is a processing time that the radio frequency transceiver 124 transmits the radio frequency packet RP.

On the other hand, in step S230, the radio frequency transceiver 144 starts to receive the radio frequency packet RP from the time point T2, and the radio frequency transceiver 144 may receive the radio frequency packet RP at the time point T4. Afterward, form the time point T4 to the time point T5, the radio frequency transceiver 144 may confirm content or integrity of the radio frequency packet RP. In this embodiment, the radio frequency transceiver 144 completes a receiving process of the radio frequency packet RP at the time point T5. As the embodiment shown in FIG. 3B, when the radio frequency packet is completely received at the time point T5, the radio frequency transceiver 144 generates the second interrupt signal INT2 immediately to the control circuit 142 in step S240.

As shown in FIG. 1 and FIG. 3B, the second interrupt signal INT2 is configured to trigger a second timer TC2 of the control circuit 142. In an embodiment, the second timer TC2 can be a time counter or a clock signal generator implemented by software/firmware programs run on the control circuit 142. In another embodiment, the second timer TC2 can be a frequency controlled oscillator or a clock generating circuit implemented by hardware circuits in the control circuit 142.

As shown in FIG. 3B, the second interrupt signal INT2 arrive the control circuit 142 at a time point T6 later than the time point T5. There is a time gap G4 between the time points T5 and T6. The time gap G4 is induced by a circuitry path between the radio frequency transceiver 144 and the control circuit 142. In practices, the circuitry path is usually short because the radio frequency transceiver 144 and the control circuit 142 are both implemented in the second electronic apparatus 140. Therefore, the time gap G4 is usually shorter than 1 microsecond. The second timer TC2 is activated to accumulate a time count after the time point T6 in response to the second interrupt signal INT2.

In order to achieve time synchronization on the first electronic apparatus 120 and the second electronic apparatus 140, the time count on the second timer TC2 is desired to be in the same as the time count on the first timer TC1. To achieve aforesaid purpose, the control circuit 142 is required to examine an predict time (i.e., the time point T3) when the first timer TC1 activates to accumulate the time count, such that the control circuit 142 can match the time count on the second timer TC2 to be in the same as the time count on the first timer TC1.

As shown in FIG. 3B, there is a time gap G5 between the time point T6 and the time point T3. If the second electronic apparatus 140 can obtain a length of the time gap G5, the control circuit 142 can calculate the time point T3 by "T3=T6−G5".

As shown in FIG. 3B, a total length of the time gaps G1 and G5 is equal to a total length of the time gaps GRP and G4. Aforesaid relationship can be represented as:

$$G1+G5=GRP+G4$$

In the embodiment, the time gap G4 of transmitting the second interrupt signal INT2 has approximate the same length as the time gap G1 of transmitting the first interrupt signal INT1. It can be assumed that G1=G4, such that the time gap G5 is equal to a transmission time gap GRP. The transmission time gap GRP is a total transmission time of the radio frequency packet RP started from the time point T1 to the time point T5. In the embodiment, the second electronic apparatus 140 does not know the time point T1. In the embodiment, the second electronic apparatus 140 is configured to estimate the transmission time gap GRP according to a length of the radio frequency packet RP.

Figure 2B:
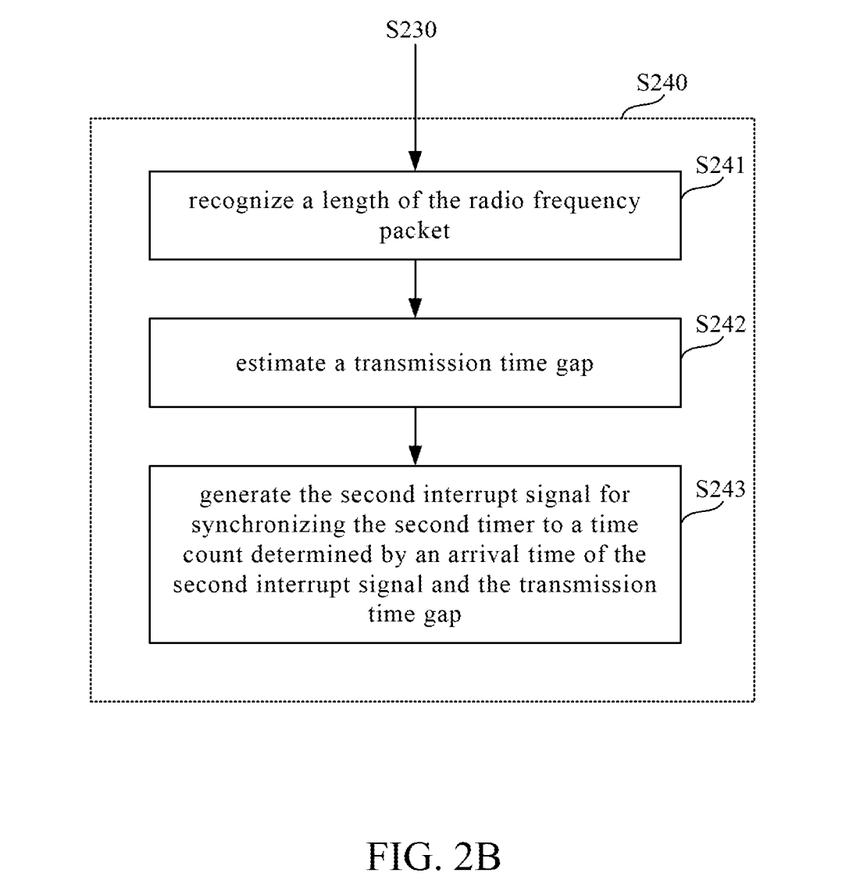
FIG. 2B is a flow chart illustrating further steps in one step shown in FIG. 2A.

Reference is further made to FIG. 2B, which is a flow chart illustrating further steps S241-S243 in the step S240 in FIG. 2A. As shown in FIG. 2B, in step S241, the second electronic apparatus 140 recognize the length of the radio frequency packet RP. In an embodiment, the length of the radio frequency packet RP can be recognized by the second radio frequency transceiver 144. The second radio frequency transceiver 144 can calculate the length of the radio frequency packet RP. In another embodiment, the length of the radio frequency packet RP is predetermined and known by the first electronic apparatus 120 and the second electronic apparatus 140.

For example, the length of the radio frequency packet RP is 32 bytes, 64 bytes or 128 bytes. The time gap G3 can be determined by the length of the radio frequency packet RP. For example, the time gap G3 can be 360 microseconds when the length of the radio frequency packet RP is 32 bytes; and the time gap G3 can be 720 microseconds when the length of the radio frequency packet RP is 64 bytes. The transmission time gap GRP is slightly longer than the time gap G3. In step S242, the second electronic apparatus 140 estimates the transmission time gap GRP from the first radio frequency transceiver 124 starting to transmit the radio frequency packet RP (at the time point T1) until the second radio frequency transceiver 144 completely receiving the radio frequency packet RP (at the time point T5) according the length of the radio frequency packet.

For example, if the length of the radio frequency packet is 32 bytes, the second electronic apparatus 140 estimates the transmission time gap GRP to be 361 microseconds (=G3+1 microsecond). If the length of the radio frequency packet is 64 bytes, the second electronic apparatus 140 estimates the transmission time gap GRP to be 721 microseconds (=G3+1 microsecond). The difference of aforesaid 1 microsecond is induced by the radio frequency transceiver 124 in preparation of the radio frequency packet RP. In this case, the second electronic apparatus 140 is able to calculate the predicted time of the time point T3 as "T3=T6−GRP". In step S243, the second radio frequency transceiver 144 generates the second interrupt signal INT2 for synchronizing the second timer TC2 to a time count determined by an arrival time (i.e., the time point T6) of the second interrupt signal INT2 and the transmission time gap GRP.

As shown in FIG. 3B, the time count on the second timer TC2 is in the same number as the clock signal on the first timer TC1 (which started as the time point T3). In an embodiment, the second electronic apparatus 140 estimates the transmission time gap GRP and/or the predicted time of the time point T3, and accordingly the second electronic apparatus 140 controls the second timer TC2 to start counting from the time count "12", such that the time count on the second timer TC2 is in the same time count as the time count on the first timer TC1.

In another embodiment, the second electronic apparatus 140 is able to estimate the time stamp of the first timer TC1 according to the transmission time gap GRP and the arrival time (i.e., the time point T6) of the second interrupt signal INT2. For example, a time stamp corresponding to the time point T6 is examined by the control circuit 142 to be "2018-01-26-1136-36454" and the transmission time gap GRP is estimated by the control circuit 142 to be 11 millisecond, such that the time stamp on the first timer TC1 can be predicted by the control circuit 142 to be "2018-01-26-1136-36443".

In this case, even the first timer TC1 and the second timer TC2 are started after different time points, the time counts on the first timer TC1 and the second timer TC2 can be the identical. The second electronic apparatus 140 can modulate the time count on the second timer TC2 according to the transmission time gap GRP of the radio frequency packet RP. As shown in FIG. 2A, the synchronization method 200 is able to synchronize the first timer TC1 and the second timer TC2 on two electronic apparatus 120 and 140 through steps S210-S240.

In an embodiment, the first electronic apparatus 120 is a controller device of a virtual reality system, and the second electronic apparatus 140 is a head-mounted display device of the virtual reality system. In this case, the controller device and the head-mounted display device of the virtual reality system can communicate with each other in synchronized time reference based on the synchronization method 200 shown in aforesaid embodiments. The disclosure is not limited thereto. In another embodiment, the first electronic apparatus 120 is the head-mounted display device of the virtual reality system, and the second electronic apparatus 140 is the controller device of the virtual reality system.

Figure 4A:
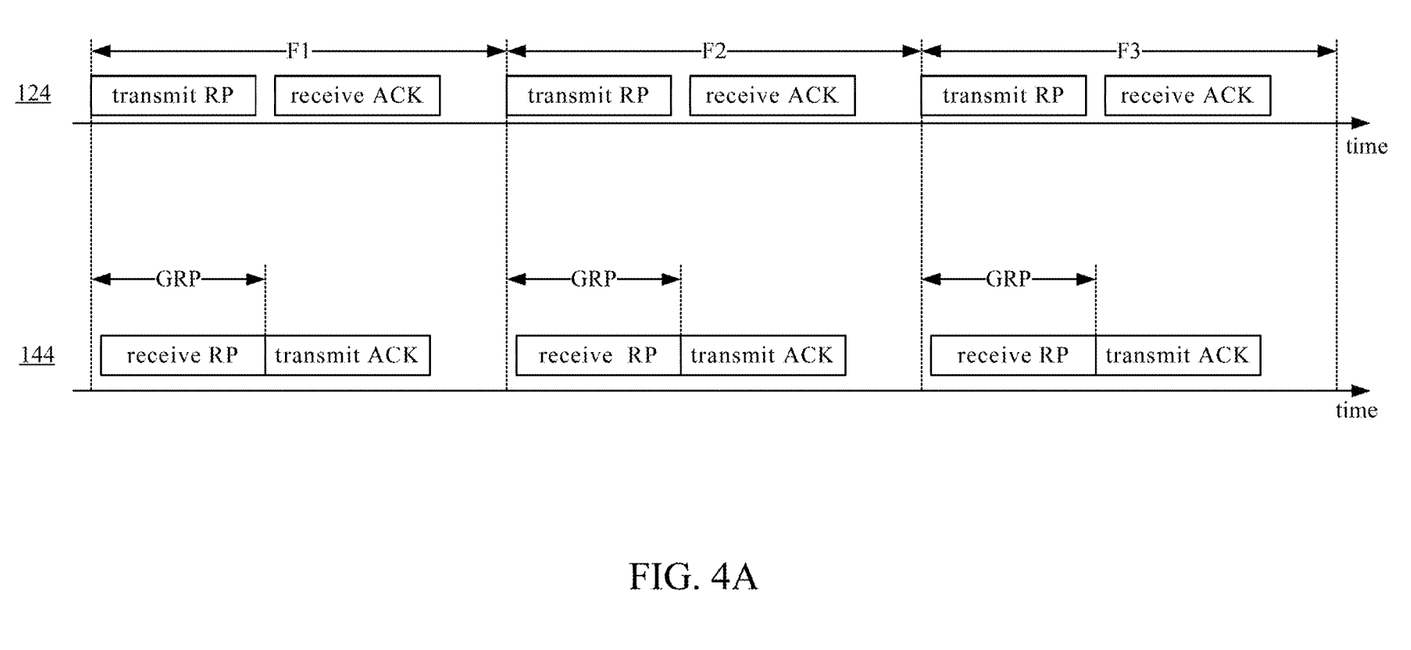
FIG. 4A is a time diagram illustrating the radio frequency packet and an acknowledge packet transmitted between the radio frequency transceivers according to an embodiment.
Figure 4B:
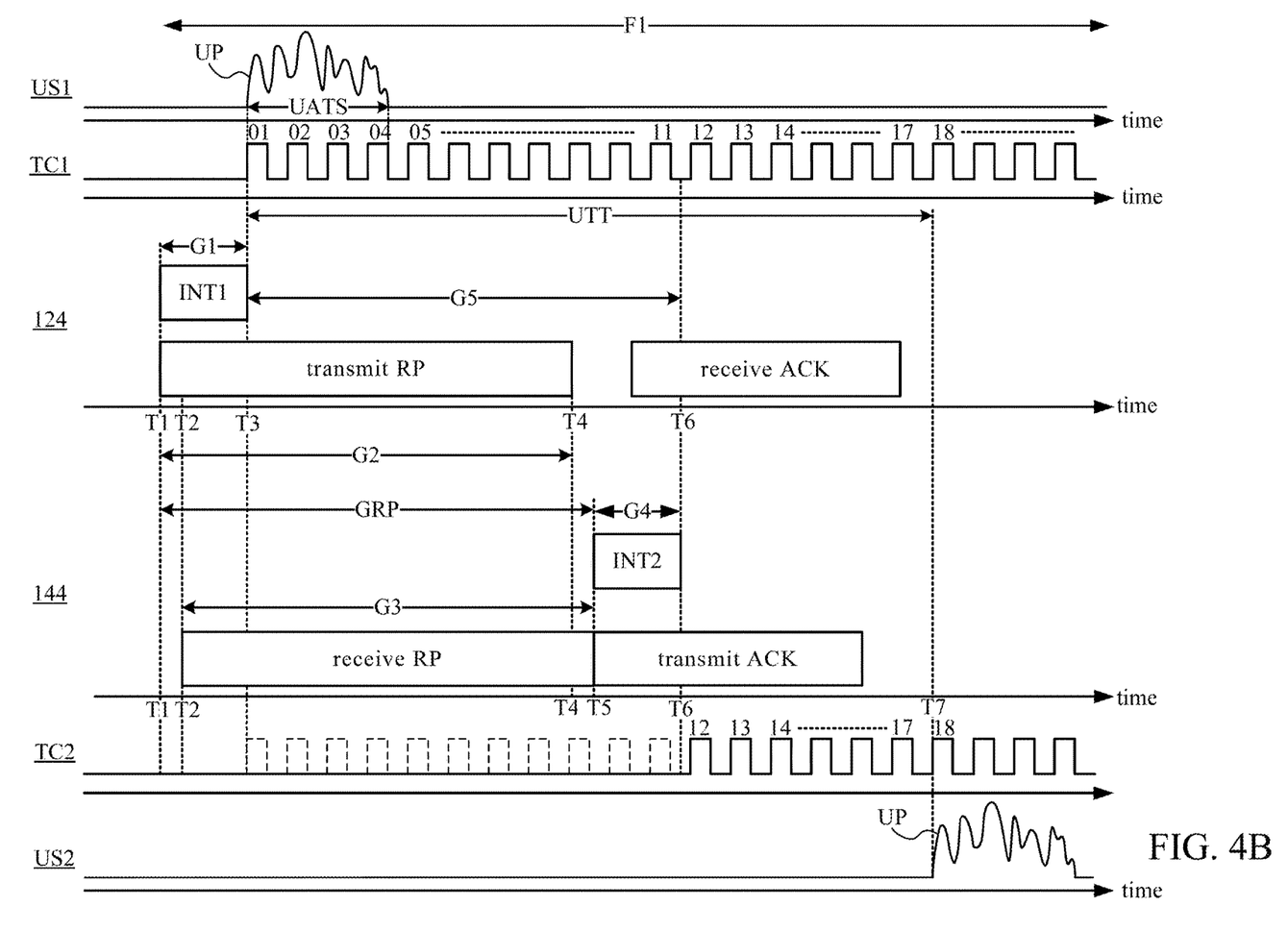
FIG. 4B is a time diagram illustrating more details about the first interrupt signal, the radio frequency packet, the second interrupt signal and a ultrasound signal during one frame shown in FIG. 4A according to an embodiment.

In an embodiment, the second radio frequency transceiver 144 further transmits an acknowledge packet ACK to the first radio frequency transceiver 124 after the radio frequency packet RP is received. Reference is further made to FIG. 4A and FIG. 4B. FIG. 4A is a time diagram illustrating the radio frequency packet RP and the acknowledge packet ACK transmitted between the radio frequency transceiver 124 and the radio frequency transceiver 144 according to an embodiment.

In the embodiment shown in FIG. 4A, there are three consequent frames F1, F2 and F3. In an embodiment, each of the frames F1, F2 and F3 has an equal duration length. For example, the durations of the frames F1, F2 and F3 are all equal to a fixed radio frequency transmission interval (e.g., 5 milliseconds or 10 milliseconds). In this case, the radio frequency transceiver 144 will receive one radio frequency packet RP from the radio frequency transceiver 124 in every one radio frequency transmission interval. After receiving the radio frequency packet RP, the radio frequency transceiver 144 will send the acknowledge packet ACK back to the radio frequency transceiver 124. The radio frequency transceiver 124 will receive the acknowledge packet ACK from the radio frequency transceiver 144.

FIG. 4B is a time diagram illustrating more details about the first interrupt signal INT1, the radio frequency packet RP, the second interrupt signal INT2 and a ultrasound signal US during the frame F1 shown in FIG. 4A according to an embodiment. The relationships and details about the first interrupt signal INT1, the radio frequency packet RP, the second interrupt signal INT2 in FIG. 4B are similar to aforesaid embodiment shown in FIG. 3B, and not to be repeated here.

In an embodiment, the communication system 100 can perform further steps S250-S280 to transmit an ultrasound packet UP based on the synchronized time counts on the first timer TC1 and the second timer TC2. As shown in FIG. 1 and FIG. 4B, in step S250, when the first timer TC1 starts counting (at the time point T3 in FIG. 4B) after being triggered by the first interrupt signal INT1, the first ultrasound transceiver 126 sends an ultrasound signal US1 as shown in FIG. 4B. The ultrasound packet UP is sent over the ultrasound signal US1 at the time point T3 in accordance with the first timer TC1. In this embodiment, a transmission of the ultrasound packet from the first ultrasound transceiver 126 starts at the time point T3. The second ultrasound transceiver 146 receives an ultrasound signal US2 as shown in FIG. 4B. The ultrasound packet UP is received in the ultrasound signal US2 by the second ultrasound transceiver 146 at the time point T7.

In step S260, the first ultrasound transceiver 126 transmits the ultrasound packet UP in an ultrasound active time slot UATS as shown in FIG. 4B. In step S270, the second ultrasound transceiver 146 receives the ultrasound packet UP. In step S280, the second ultrasound transceiver 146 samples the ultrasound packet UP in accordance with the second timer TC2. For example, the data in the ultrasound packet UP is processed, decoded or decrypted with the clock signal on the second timer TC2. Because the second timer TC2 is synchronized with the first timer TC1, a travelling time UTT of the ultrasound packet UP from the ultrasound transceiver 126 to the ultrasound transceiver 146 can be calculated in reference to the second timer TC2. In this case, when the ultrasound packet UP is received by the ultrasound transceiver 146 can send another interrupt signal to the control circuit 142. The control circuit 142 will notice that the ultrasound packet UP is received at the time point T7, which correspond to the time count "18" on the second timer TC2. The control circuit 142 can calculate the travelling time UTT by "UTT=T7−T3". In the embodiment shown in FIG. 4B, the travelling time UTT is equal to 17 units (=18-01) of time counts on the second timer TC2 (or the first timer TC1).

In an embodiment, the first timer TC1 and the second timer TC2 may still have slight timing difference, which is also known as a timing jitter. In one embodiment, the timing jitter between first timer TC1 and the second timer TC2 should be less than 3 milliseconds, such that the first electronic apparatus 120 and the second electronic apparatus 140 can be synchronized with accuracy at a millisecond-scaler level.

As shown in FIG. 4B, the radio frequency transceiver 144 will send the acknowledge packet ACK back to the radio frequency transceiver 124 after the time point T5. Afterward, the radio frequency transceiver 124 will receive the acknowledge packet ACK from the radio frequency transceiver 144. As shown in FIG. 4B, the ultrasound signal US1 is utilized to transmit an ultrasound packet in the ultrasound active time slot UATS.

In an embodiment, the acknowledge packet ACK is utilized to carry an adjustment command from the second electronic apparatus 140 to the first electronic apparatus 120. The first electronic apparatus 120 adjusts the ultrasound active time slot UATS according to the adjustment command in the acknowledge packet ACK. For example, the ultrasound active time slot UATS can be widen, shorten, shifted to be earlier or later according to the adjustment command carried in the acknowledge packet ACK.

In aforesaid embodiment shown in FIG. 2A-2B and FIG. 4B, the synchronization between the first timer TC1 and the second timer TC2 is utilized to determine the travelling time UTT of the ultrasound packet UP between the first electronic apparatus 120 and the second electronic apparatus 140, such that the second electronic apparatus 140 can measure a relative distance to the first electronic apparatus 120 according to the travelling time UTT. The disclosure is not limited thereto. In other embodiments, the synchronization between the first timer TC1 and the second timer TC2 can be utilized to synchronize Simultaneous Localization and Mapping (SLAM) data, camera explore behaviors, video frames and/or Inertial Measurement Unit (IMU) data timestamps on different electronic apparatus.

Figure 5:
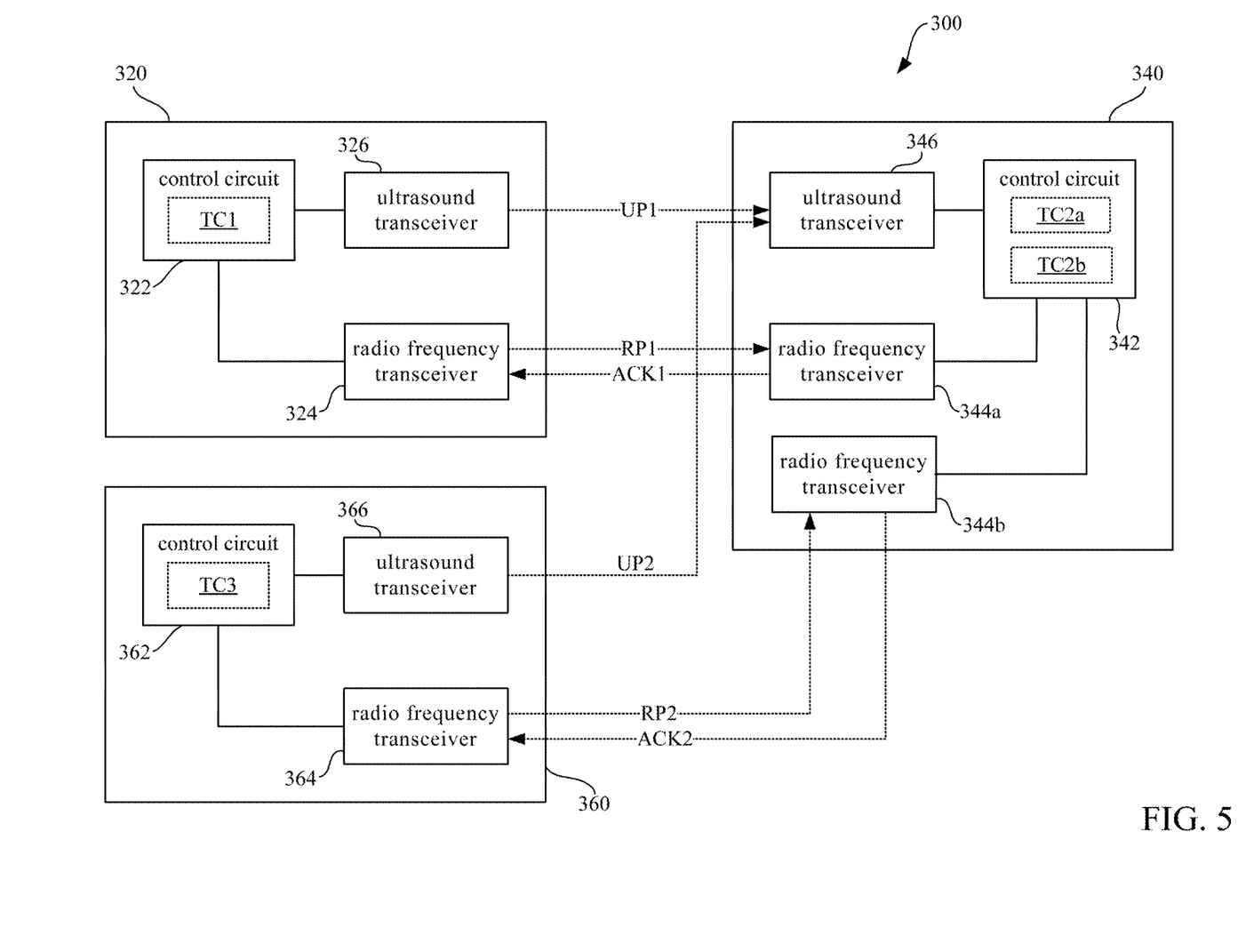
FIG. 5 is a functional block diagram illustrating a communication system according to an embodiment of the disclosure.

Aforesaid embodiments illustrate that there are two electronic apparatus 120 and 140 in the communication system 100, and the disclosure is not limited to two electronic apparatus. Reference is further made to FIG. 5, which is a functional block diagram illustrating a communication system 300 according to an embodiment of the disclosure.

In the embodiment shown in FIG. 5, the communication system 300 includes a first electronic apparatus 320, a second electronic apparatus 340 and a third electronic apparatus 360.

The first electronic apparatus 320 and the second electronic apparatus 340 are able to communicate with each other. For example, data, commands, and/or control signals can be transmitted from the first electronic apparatus 320 to the second electronic apparatus 340 or from the second electronic apparatus 340 to the first electronic apparatus 320. The third electronic apparatus 360 and the second electronic apparatus 340 are able to communicate with each other. For example, data, commands, and/or control signals can be transmitted from the third electronic apparatus 360 to the second electronic apparatus 340 or from the second electronic apparatus 340 to the third electronic apparatus 360.

As shown in FIG. 5, the first electronic apparatus 320 includes a control circuit 322, a radio frequency transceiver 324 and an ultrasound transceiver 326. The second electronic apparatus 340 include a control circuit 342, a radio frequency transceiver 344a, another radio frequency transceiver 344b and an ultrasound transceiver 346. The third electronic apparatus 360 include a control circuit 362, a radio frequency transceiver 364 and an ultrasound transceiver 366.

The radio frequency transceiver 324 of the first electronic apparatus 320 is configured to transmit a radio frequency packet RP1 to the radio frequency transceiver 344a of the second electronic apparatus 340, and simultaneously generates an interrupt signal to trigger a timer TC1 in the control circuit 322. The radio frequency transceiver 364 of the third electronic apparatus 360 is configured to transmit another radio frequency packet RP2 to the radio frequency transceiver 344b of the second electronic apparatus 340, and simultaneously generate an interrupt signal to trigger the timer TC3 in the control circuit 362. The radio frequency transceiver 344a generate an interrupt signal to trigger a timer TC2a in the second control circuit 342 in response to that the radio frequency packet RP1 is received. The radio frequency transceiver 344b generate an interrupt signal to trigger a timer TC2b in the second control circuit 342 in response to that the radio frequency packet RP2 is received.

The ultrasound transceiver 326 of the first electronic apparatus 320 is configured to transmit an ultrasound packet UP1 to the radio ultrasound 346 of the second electronic apparatus 340. The ultrasound transceiver 366 of the third electronic apparatus 360 is configured to transmit another ultrasound packet UP2 to the ultrasound transceiver 346 of the second electronic apparatus 340.

The first electronic apparatus 320 and the second electronic apparatus 340 are able to utilize the synchronization method 200 in aforesaid embodiments to synchronize the timer TC1 and the timer TC2a. Details about how to synchronize are disclosed in aforesaid embodiments and not to be repeated here. Similarly, the third electronic apparatus 360 and the second electronic apparatus 340 are able to utilize the synchronization method 200 in aforesaid embodiments to synchronize the timer TC3 and the timer TC2b. Therefore, the ultrasound packet UP1 and the ultrasound packet UP2 can be processed with synchronized clock signals.

In addition, the radio frequency transceiver 344a of the second electronic apparatus 340 is able to transmit an acknowledge packet ACK1 to the first electronic apparatus 320, and the radio frequency transceiver 344b of the second electronic apparatus 340 is able to transmit another acknowledge packet ACK2 to the third electronic apparatus 360. The acknowledge packets ACK1 and ACK2 are able to carry adjustment commands from the second electronic apparatus 340 to the first electronic apparatus 320 and the third electronic apparatus 360. The adjustment commands are configured to differentiate the ultrasound active time slots utilized by the first electronic apparatus 320 and the third electronic apparatus 360. In an embodiment, the adjustment commands are configured to separate the ultrasound active time slots into two non-overlapping periods. In this case, the ultrasound active time slot utilized by the first electronic apparatus 320 is different from and not overlapped with the ultrasound active time slot utilized by the third electronic apparatus 360. The ultrasound packet UP1 and the ultrasound packet UP2 will not be interfere with each other, and the second electronic apparatus 340 can easily recognize an origin of the ultrasound packet UP1 or the ultrasound packet UP2 according the ultrasound active time slots.

In an embodiment, the first electronic apparatus 320 and the third electronic apparatus 360 are controller devices of a virtual reality system, and the second electronic apparatus 340 is a head-mounted display device of the virtual reality system. In this case, the controller device and the head-mounted display device of the virtual reality system can communicate with each other in synchronized time reference based on the synchronization method 200 shown in aforesaid embodiments.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A communication system, comprising:
   a first electronic apparatus, comprising:
      a first control circuit;
      a first radio frequency transceiver coupled with the first control circuit, the first radio frequency transceiver being configured to generate a first interrupt signal to the first control circuit and transmit a radio frequency packet; and a first ultrasound transceiver configured to transmit an ultrasound packet in an ultrasound active time slot; and a second electronic apparatus, comprising:

a second control circuit;

a second radio frequency transceiver coupled with the second control circuit, the second radio frequency transceiver being configured to receive the radio frequency packet and generate a second interrupt signal to the second control circuit in response to that the radio frequency packet is received; and a second ultrasound transceiver configured to receive the ultrasound packet from the first electronic apparatus;

wherein the first interrupt signal is configured to trigger a first timer of the first control circuit, the second interrupt signal is configured to trigger a second timer of the second control circuit, the second timer is synchronized with the first timer or a timestamp of the first timer is estimated according to the second interrupt signal and the radio frequency packet, wherein a first transmission latency between the first radio frequency transceiver and the second radio frequency transceiver is shorter than a second transmission latency between the first ultrasound transceiver and the second ultrasound transceiver.

2. The communication system of claim 1, wherein the first radio frequency transceiver generates the first interrupt signal and starts to transmit the radio frequency packet simultaneously, and the second radio frequency transceiver generates the second interrupt signal immediately when the radio frequency packet is completely received.

3. The communication system of claim 1, wherein a length of the radio frequency packet transmitted from the first electronic apparatus is recognized by the second electronic apparatus, the second electronic apparatus estimates a transmission time gap from the first radio frequency transceiver starting to transmit the radio frequency packet until the second radio frequency transceiver completely receiving the radio frequency packet according to the length of the radio frequency packet.

4. The communication system of claim 3, wherein the second timer is activated by the second interrupt signal and the second timer is synchronized to a time count determined by an arrival time of the second interrupt signal received by the second control circuit and the transmission time gap.

5. The communication system of claim 1, wherein the ultrasound packet is generated by the first ultrasound transceiver in accordance with the first timer, and the ultrasound packet is sampled by the second ultrasound transceiver in accordance with the second timer.

6. The communication system of claim 5, wherein the second radio frequency transceiver is configured to transmit an acknowledge packet to the first radio frequency transceiver after the radio frequency packet is received.

7. The communication system of claim 6, wherein the acknowledge packet carries an adjustment command from the second electronic apparatus to the first electronic apparatus, the first electronic apparatus adjust the ultrasound active time slot according to the adjustment command.

8. The communication system of claim 1, wherein the first electronic apparatus is a controller device or a head-mounted display device of a virtual reality system, and the second electronic apparatus is the controller device or the head-mounted display device of the virtual reality system.

9. A synchronization method, suitable between a first electronic apparatus and a second electronic apparatus, the synchronization method comprising:

generating, by a first radio frequency transceiver, a first interrupt signal to trigger a first timer on the first electronic apparatus;

transmitting a radio frequency packet from the first electronic apparatus to the second electronic apparatus;

in response to that the radio frequency packet is received by the second electronic apparatus, generating, by a second radio frequency transceiver, a second interrupt signal to trigger a second timer on the second electronic apparatus, wherein the second timer is synchronized with the first timer or a timestamp of the first timer is estimated according to the second interrupt signal and the radio frequency packet; and transmitting an ultrasound packet in an ultrasound active time slot from the first electronic apparatus to the second electronic apparatus, wherein a first transmission latency between the first radio frequency transceiver and the second radio frequency transceiver is shorter than a second transmission latency between the first ultrasound transceiver and the second ultrasound transceiver.

10. The synchronization method of claim 9, wherein the first interrupt signal is generated simultaneously with the first electronic apparatus and starts to transmit the radio frequency packet, and the second interrupt signal is generated immediately when the radio frequency packet is completely received by the second electronic apparatus.

11. The synchronization method of claim 9, further comprising:

recognizing, by the second electronic apparatus, a length of the radio frequency packet transmitted from the first electronic apparatus; and estimating, by the second electronic apparatus, a transmission time gap from the first radio frequency transceiver starting to transmit the radio frequency packet until the second radio frequency transceiver completely receiving the radio frequency packet according to the length of the radio frequency packet.

12. The synchronization method of claim 11, wherein the second timer is activated by the second interrupt signal and the second timer is synchronized to a time count determined by an arrival time of the second interrupt signal and the transmission time gap.

13. The synchronization method of claim 9, wherein the ultrasound packet is generated by the first electronic apparatus in accordance with the first timer, and the ultrasound packet is sampled by the second electronic apparatus in accordance with the second timer.

14. The synchronization method of claim 13, further comprising:

transmitting an acknowledge packet from the second electronic apparatus to the first electronic apparatus after the radio frequency packet is received.

15. The synchronization method of claim 14, wherein the acknowledge packet carries an adjustment command from the second electronic apparatus to the first electronic apparatus, the synchronization method further comprising:

adjusting, by the first electronic apparatus, the ultrasound active time slot according to the adjustment command.

* * * * *